(No Model)
C. WOOSTER.
TILTING SADDLE BAR AND SEAT POST FOR BICYCLES.
No. 585,858.  Patented July 6, 1897.
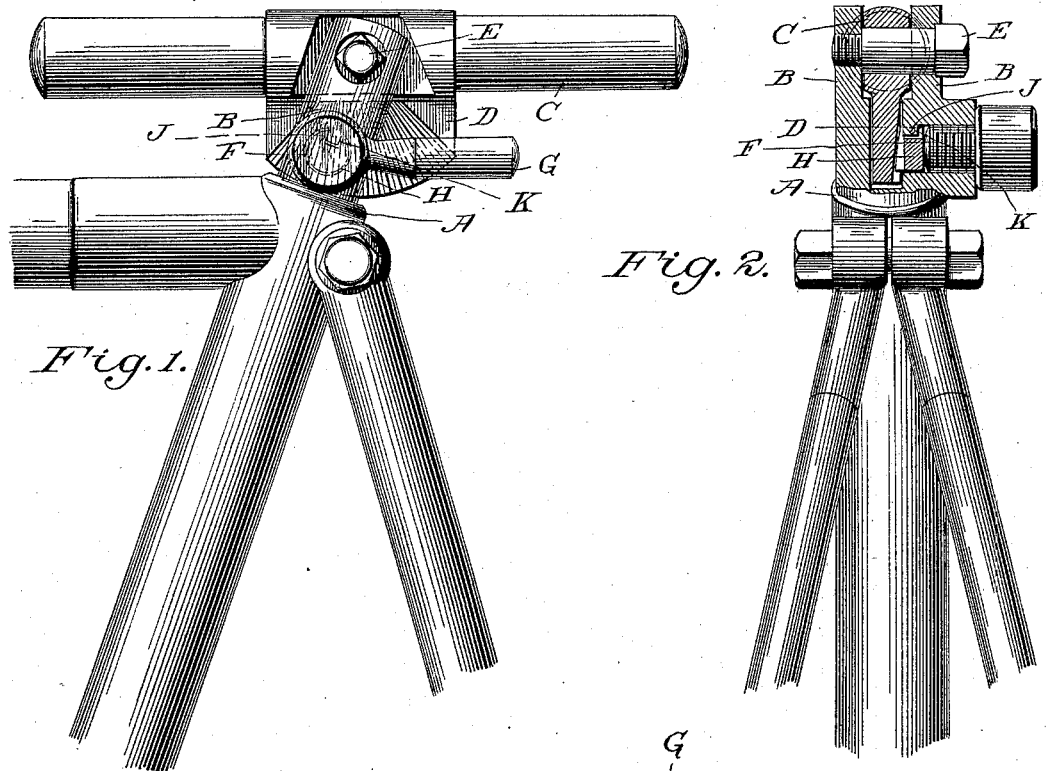
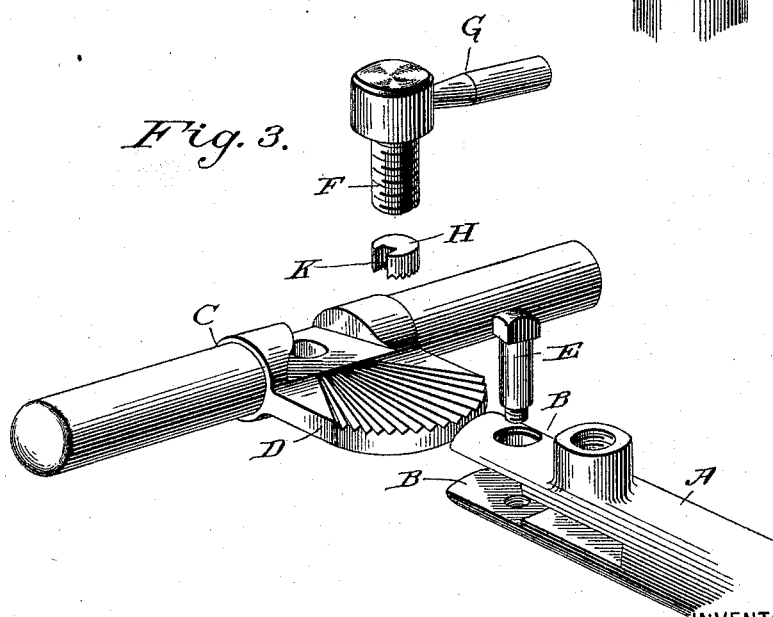
WITNESSES:
INVENTOR,
CHARLES WOOSTER,
BY
HIS ATTORNEYS.

UNITED STATES PATENT OFFICE.

CHARLES WOOSTER, OF NEW YORK, N. Y.

TILTING SADDLE-BAR AND SEAT-POST FOR BICYCLES.

SPECIFICATION forming part of Letters Patent No. 585,858, dated July 6, 1897.

Application filed April 20, 1896. Serial No. 588,398. (No model.)

*To all whom it may concern:*

Be it known that I, CHARLES WOOSTER, a citizen of the United States, residing in the city of New York, in the county and State of New York, have invented a new and useful Tilting Saddle-Bar and Seat-Post for Bicycles, of which the following is a specification.

The object of my invention is to secure an easily-adjustable saddle or seat which may be rendered adaptable to any rider or to the same rider under different circumstances, as will be explained.

Referring to the accompanying drawings, which form a part of this specification, Figure 1 represents a side elevation of a portion of a bicycle-frame with my improvements upon it. Fig. 2 is a sectional view of same. Fig. 3 is a perspective view showing the parts separated but in their relative positions to each other.

In the drawings, A represents a saddle-post provided with a bifurcated upper end having two upward extensions B B, to which is secured a tilting cross-bar C, the latter being provided with a grooved or corrugated pendent flange D, semicircular in shape and extending downwardly between the extensions B B of the vertical saddle-post. The tilting cross-bar is hinged or pivoted to the vertical post by means of the bolt E, as shown. At F, I provide a locking-bolt having a lever G for operating the same, and between the inner end of said bolt and the grooved or corrugated flange D, I place a small corrugated disk H, whose corrugations fit into the corrugations of the semicircular flange D. The corrugations on both of these parts are radially disposed, the center of same in extension being the center of the bolt E, upon which the moving parts all turn. The small corrugated disk H is not fixedly attached to any of the other parts and constitutes what I term a "floating" member of the locking mechanism. When the locking-bolt F is withdrawn through the operation of the lever G, the small disk H will ride loosely upon its complementary member, but when the lever is turned in the opposite direction the interlocking teeth will mesh and upon turning the lever to its full extent a secure lock will be effected.

The saddle or seat (not shown) is secured to the tilting member in any suitable manner, but it will be noted that the cross-bar is entirely independent of the saddle and is not formed in one with it.

It can be readily seen that when the rider is mounted and in position on the bicycle the pitch or tilt of the saddle or seat can be easily altered, and without trouble or difficulty.

I provide at J a lug or pin which fits into a corresponding slot K of the corrugated floating disk H, serving to keep it to its proper radial position.

The invention possesses the double utility of being adaptable for different persons upon the same vehicle, and also, as is well known, it is valuable in that the same rider may from time to time adjust the pitch of his seat or saddle, and thus ease his movement and conserve his strength.

The locking (or what I may term the "clutch") mechanism shown and described may be varied slightly without departing from the spirit of my invention, but I wish it to be understood that I consider the novel points as residing in a saddle-tilting mechanism which can be easily operated while the rider is in position on the saddle or seat, and by "tilting" mechanism I mean a mechanism adapted to tilt the seat forward and aft and not from side to side and also in the particular lock or clutch for securing the result, which lock or clutch is composed of two complementary radially-disposed toothed disks, one member of which is fixed and the other member of which is floating and which can be operated as aforesaid.

Having thus described my invention, the following is what I claim as new therein and desire to secure by Letters Patent:

A saddle-post constructed with a bifurcated upper end providing two extensions, a tilting cross-bar having a semicircular pendent flange formed with radial grooves, a lug adjacent to the pendent flange, a bolt whereby the cross-bar is pivoted to the bifurcated upper end, a locking-bolt beneath the pivot-bolt, and a disk formed with a slot receiving the lug, and with radial grooves and interposed between the locking-bolt and the pendent flange; substantially as described.

CHARLES WOOSTER.

Witnesses:
  HERBERT KNIGHT,
  JOHN WOOSTER.